Dec. 22, 1959 S. L. ROBINETTE, JR., ET AL 2,917,920
APPARATUS FOR TESTING METALS AND TEST SPECIMEN FOR USE THEREIN
Filed Sept. 22, 1955 3 Sheets-Sheet 1
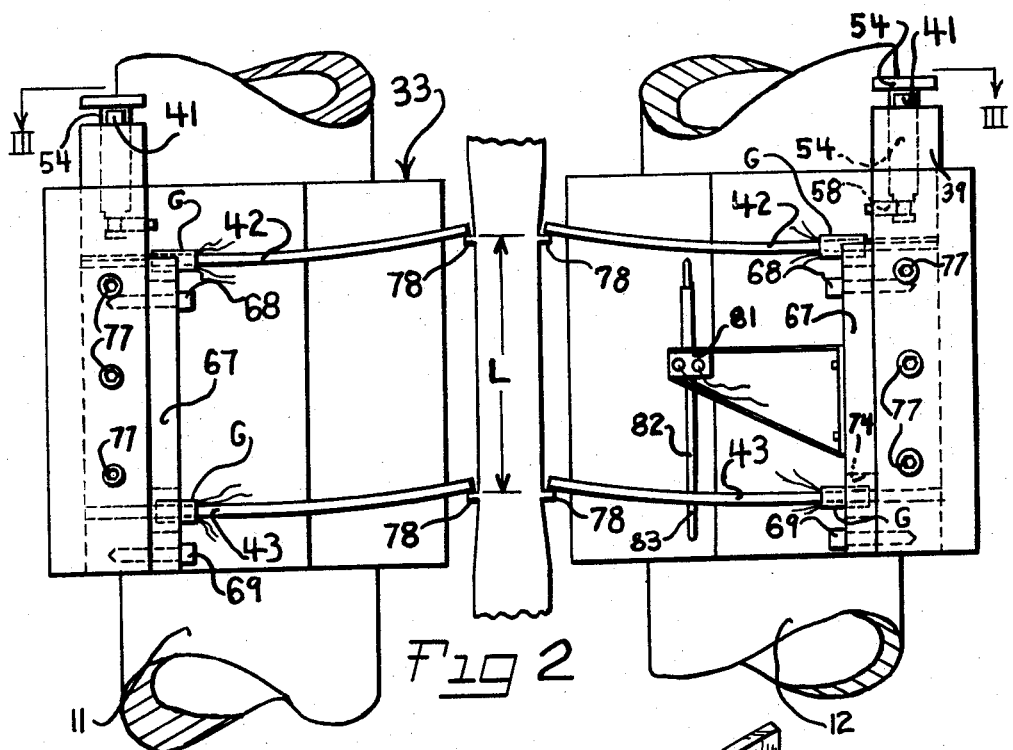
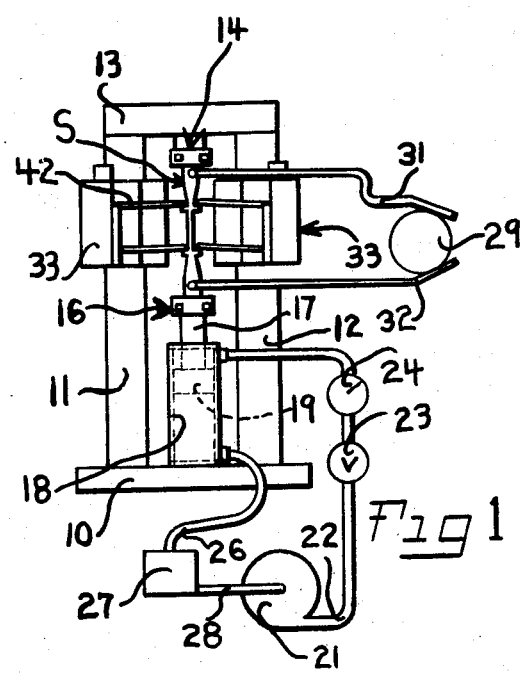
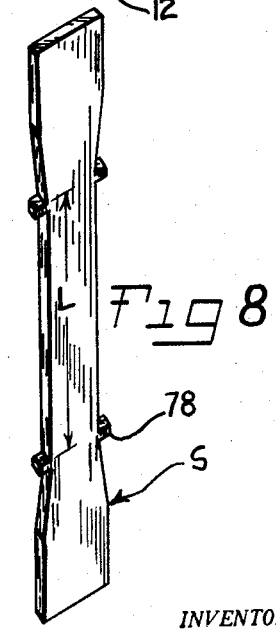
INVENTORS
SPURGEON L. ROBINETTE JR.
CLIFFORD L. DOTSON
BY
ATTORNEYS

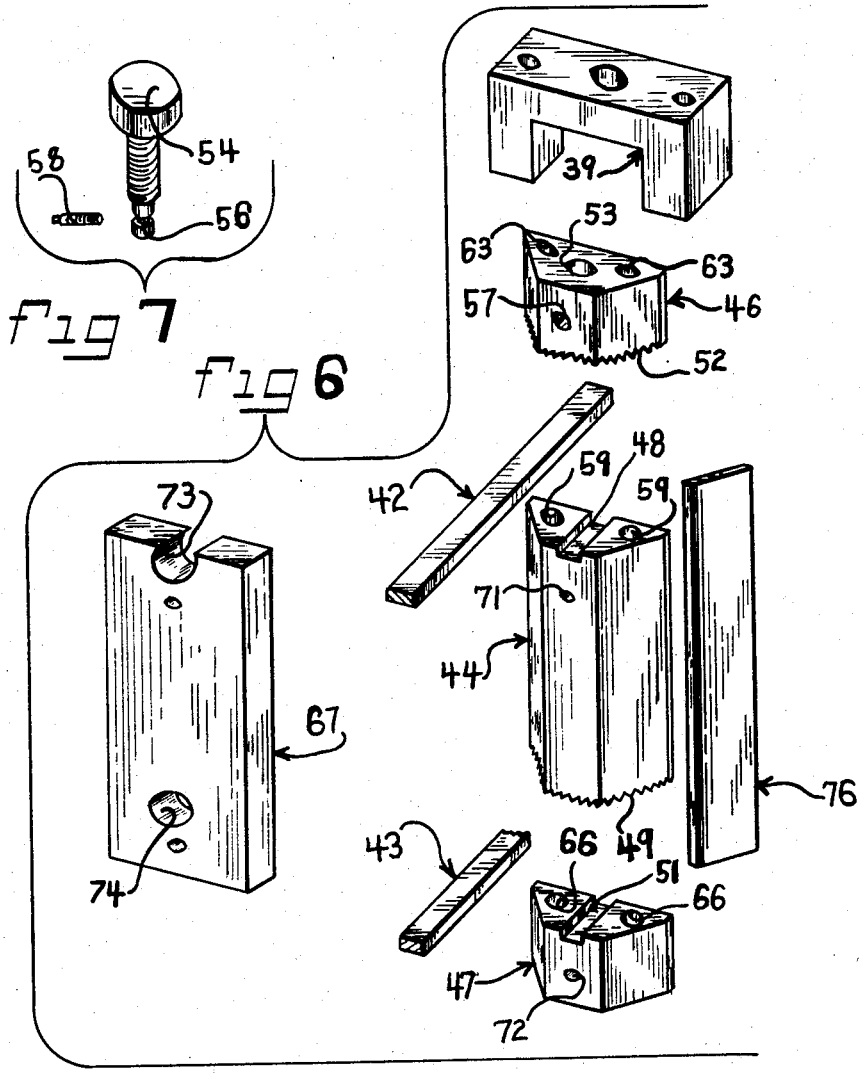

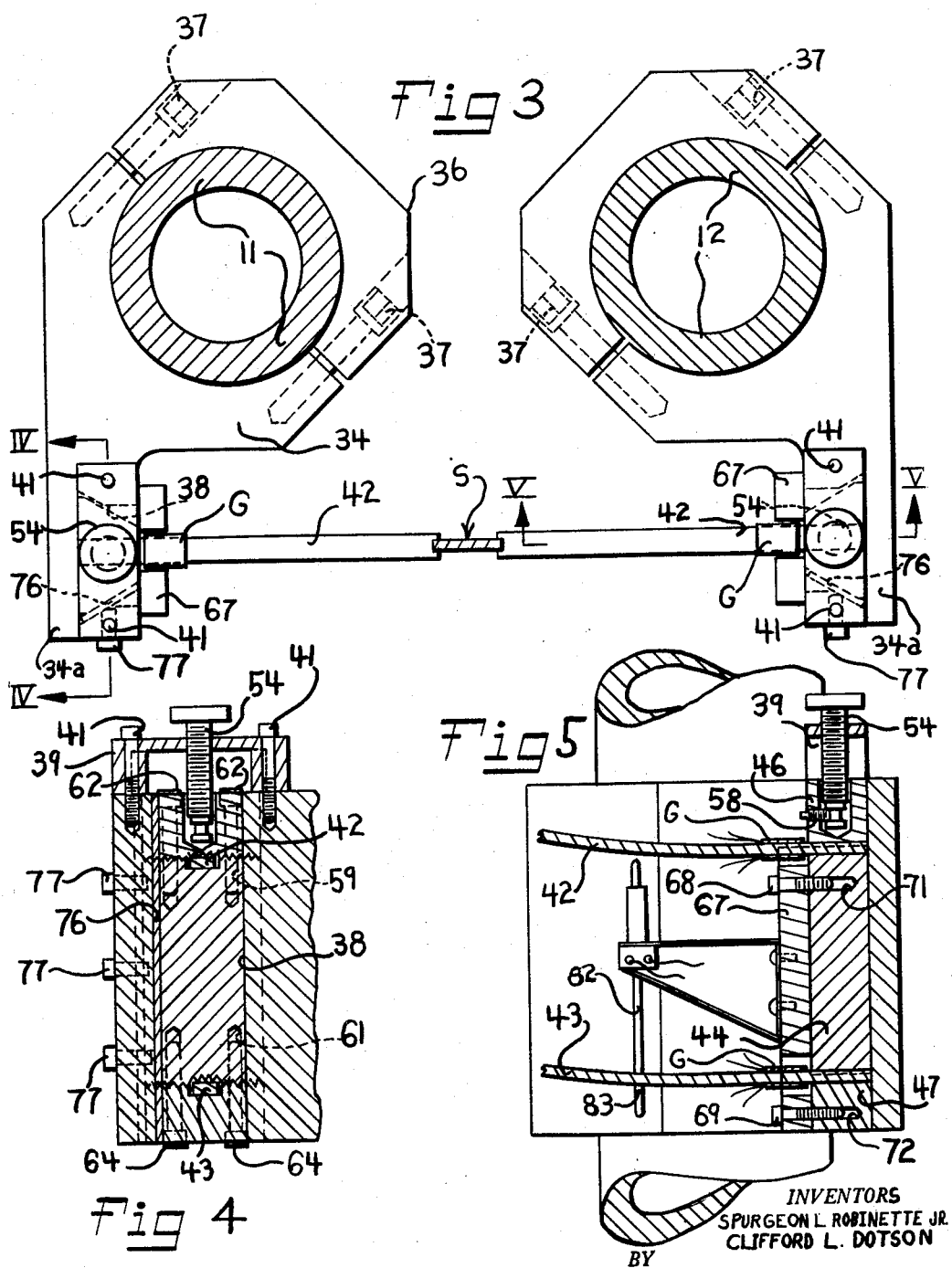

United States Patent Office 2,917,920
Patented Dec. 22, 1959

2,917,920

APPARATUS FOR TESTING METALS AND TEST SPECIMEN FOR USE THEREIN

Spurgeon L. Robinette, Jr., Atlanta, Ga., and Clifford L. Dotson, Birmingham, Ala., assignors to Southern Research Institute, a corporation of Alabama Application September 22, 1955, Serial No. 535,799

5 Claims. (Cl. 73—95)

Our invention relates to apparatus for indicating strain in metal test specimens, and while not limited thereto relates particularly to a process and apparatus for indicating strain in metal test specimens while the specimens are at high temperature and under tensile strength.

Heretofore, insofar as we are aware, there has been no entirely successful process and apparatus for determining the strain in metals in which the metal is brought very rapidly to an elevated, uniform temperature. In the design of high temperature and high velocity aircraft and rockets and engines therefor, it is essential to determine the stress strain characteristics of the portions of the engine, airframe, or body which are heated very quickly. Previous testing processes and apparatus have been limited by the fact that the readings of the strain of necessity have been taken at points somewhat remote from the extremities of the gauge length of the test specimen. Further, prior processes and apparatus have not been effective to determine accurately and quickly the characteristics of metals by rapidly increasing the tensile stress immediately after the metal has been brought quickly to a high uniform temperature. Still further, we are aware of no prior apparatus in which a test sample has been so arranged in the apparatus that it can be brought quickly and uniformly to an elevated temperature with an extensometer operatively connected to the specimen at the extremities of the gauge length. In connection with all the foregoing, the actual shape and configuration of prior test specimens has made it impossible accurately to associate strain gauges with the sample in a remote manner as we do. Suffice it to say that prior high temperature metals testing processes and apparatus leave much to be desired insofar as concerns testing of quickly heated, high temperature specimens under conditions of rapidly increasing stress.

In view of the foregoing, the prime object of our invention is to overcome the above difficulties and to provide an improved apparatus of the character designated in which, in minimum time and with maximum accuracy, tests may be conducted which will show the tensile strain on specimens of metals.

Another object is to provide a high temperature test specimen which is of a configuration affording means for operatively connecting strain gauges thereto at the extremities of the gauge length, whereby, upon putting the specimen under tensile stress the strain may be measured by gauges located at a distance from the test specimen.

A more specific object is to provide a test specimen comprising a strip of the metal to be tested having integrally formed lugs projecting from the edges thereof at the extremities of the gauge length, affording means for holding strain measuring apparatus in contact with the specimen during the test and without affecting the uniformity of temperature throughout the gauge length of the specimen.

Apparatus illustrating the constructional features of our invention and which also is suitable for carrying out our improved process is shown in the accompanying drawings forming a part of this application in which:

Fig. 1 is a front elevational view, generally diagrammatic in nature, and showing a test specimen in place in our improved apparatus, ready for testing;

Fig. 2 is an enlarged front elevational view, partly broken away in section, and showing the mounting for the extensometer arms and their relation to the test sample just prior to the commencing of the test;

Fig. 3 is a detailed sectional view taken generally along line III—III of Fig. 2;

Fig. 4 is a detailed sectional view taken generally along line IV—IV of Fig. 3;

Fig. 5 is a detailed sectional view taken generally along line V—V of Fig. 3;

Fig. 6 is an exploded isometric view showing a pair of the extensometer arms and the holders therefor;

Fig. 7 is an exploded view of the adjusting screw for one of the extensometer chucks; and, Fig. 8 is an isometric view of a test sample which is suitable for use in our improved apparatus and for carrying out our improved method.

Referring now to the drawings for a better understanding of our invention, we show in wholly diagrammatic manner in Fig. 1 an apparatus which is capable of carrying out our improved process and which also shows, in diagrammatic manner, some of the constructional features of our invention. As shown, the apparatus comprises a base plate 10 on which are supported relatively heavy, upstanding columns 11 and 12. Across the top of the columns is a plate 13. Fixed in suitable manner from an outstanding section of the plate 13 is a fixed chuck indicated generally by the numeral 14 for holding one end, in the instance shown, the upper end, of the specimen S of material to be tested.

A movable chuck 16 is carried on the upper end of a piston rod 17 of a fluid pressure cylinder indicated at 18. The piston rod 17 is fixed to the usual piston 19 slidable in the cylinder 18. Fluid under pressure may be supplied to the upper end of the cylinder 18 by means of a pump 21 through a line 22. The line 22 may have therein a control valve 23 and a pressure gauge 24. A return line 26 leads from the lower end of the cylinder to a reservoir 27. Fluid is supplied to the intake side of the pump from the reservoir 27 through a line 28.

Means for heating the specimen S quickly and uniformly is indicated diagrammatically as being a source of current, for instance a generator, current transformer or the like 29. Cables 31 and 32 are connected to the specimen S, preferably outside the gauge length L of the specimen as indicated in Figs. 1 and 8.

On each of the columns 11 and 12 is mounted one of our improved mechanisms for operatively connecting strain gauges to the specimen S in our improved manner and to obtain our improved results. As shown in Fig. 1 these units of our improved apparatus are indicated generally by the numeral 33. Since the units 33, together with the flexible arms which directly contact the speciment S are identical, a description of one will suffice for both.

As best shown in Figs. 2 to 5, inclusive, each of the units 33 comprises a clamp which consists of two halves 34 and 36. The halves are clamped about the columns 11 and 12 by means of bolts 37.

The half 34 of the clamping member has an extension 34a thereon in which there is a vertically extending, dove-tail groove 38. Straddling the upper end of the dove tail groove is an inverted U-shaped yoke 39. Bolts 41 pass through the leg of the yoke into threaded holes in the extension 34a of the clamp half 34, thus to secure the yoke in place over the upper end of the groove 38.

The chucks for holding the upper and lower flexible arms 42 and 43, respectively, and for prestressing these arms as later will appear will now be described. As shown in Figs. 3 to 6 of the drawings, the chuck comprises an intermediate dove-tail section 44, an upper dove-tail section 46 and a lower dove-tail section 47, all of which are adapted slidably to fit in the dove-tail groove 38. The upper end of the intermediate section 44 has a slot 48 therein for receiving the outer end of the flexible arm 42. The lower end surface of the intermediate section 44 is serrated as indicated at 49. The upper end of the chuck section 47 has a slot 51 therein for receiving the outer end of the lower flexible arm 43. The lower end surface of the upper chuck section 46 is serrated as indicated at 52. As will presently appear, when the chuck sections 44, 46 and 47 are clamped together, the outer ends of the arms 42 and 43 are rigidly clamped therebetween.

In the upper end of the chuck section 46 is a hole 53. Threaded through the horizontal section of the yoke 39 is an adjusting screw 54. The screw 54 has a reduced lower end which is adapted to fit loosely in the opening 53 in the chuck section 46. The reduced end of the screw 54 is provided with an annular groove 56. Opening into the vertical hole 53 is a lateral opening 57 which is tapped to receive a screw 58. The inner end of the screw 58 fits in the annular groove 56 of the screw 54 thereby rotatably to secure the screw to the chuck section 46.

The chuck section 44 is provided with axially directed, threaded openings 59 in its upper end and similar openings 61 in its lower end. Bolts 62 pass through vertical openings 63 in the chuck section 46 and into the threaded openings 59, thereby to secure the section 46 to the upper end of the chuck section 44. In similar manner, bolts 64 pass through vertical openings 66 in the lower chuck section 46 into the threaded openings 61.

The assembly of chuck members is held in place in the groove by means of a plate 67 which is secured by screws 68 and 69 threaded into openings 71 and 72, respectively, provided in the chuck sections 44 and 47. The plate 67 is provided with clearance holes 73 and 74 for freely passing the arms 42 and 43.

From what has already been described it will be seen that with the bolts 62 and 64 in place and with the outer ends of the arms 42 and 43 engaged in the slots 48 and 51, respectively, the entire chuck assembly may be moved up and down in the dove-tail groove 38 by rotating the screw 54. This moves the arms 42—43 longitudinally of the specimen.

In order to lock the chuck assembly in selected vertical position within the groove 38, we provide a locking plate 76 which is adapted to fit between a beveled side of the groove 38 and the correspondingly beveled sides of the chuck sections 44, 46 and 47. Set screws 77 are threaded through the outer end of the extension 34a in such manner as to engage the plate 76 when the screws are run in, thereby to wedge the plate 76 against the sides of the chuck sections.

On each arm 42 and 43, preferably as close to the chucks as possible, we place upper and lower strain gauges indicated by the letters G. While there may be several kinds of such gauges that can be used with our improved apparatus and to carry out our improved process, we have found that gauges made in accordance with United States Letters Patent 2,292,549, dated August 11, 1942, entitled "Material Testing Apparatus," are entirely satisfactory. Such gauges are of the wire type which are bonded by a suitable cement to the surface of the metal to be strained. As is well understood for such devices, an increase in the tension of the wire of which the gauge is made increases the electrical resistance thereof. Gauges suitable for our purposes are offered for sale by the Baldwin Locomotive Works, Philadelphia, Pennsylvania, under the trademark "SR–4." In applying the gauges G to the arms 42 we use the cement recommended by the manufacturer of the gauge and carry out the procedure for attaching the gauges to the arms 42 and 43, just as if it were the arms themselves which would form the actual test specimens. We prefer to locate the gauges as close as possible to the chucks.

As shown more clearly in Fig. 8 of the drawings our improved form of test specimen S includes a unitary strip of the metal or other material to be tested. Except as will be hereinafter pointed out, the specimen may conveniently conform to the ASTM specification for such test specimens, insofar as concerns its gauge length L, the cross sectional area of the material in the gauge length and other dimensions.

As indicated, our improved specimen comprises what may be an otherwise ASTM standard specimen except that we provide along the specimen, at the extremities of the gauge length L, sets of integrally formed lugs 78. Thus, as indicated in Fig. 2 of the drawings the gauge length extends from the top of the lower lug 78 to the top of the upper lug 78. In actual practice we have found that a test specimen which is one-half inch in width in the gauge length L having a gauge length of two inches, and having lugs 78 which are $3/32$ inch long as measured from the adjacent edge of the material, is entirely satisfactory. In the case given the lugs were $1/16$ inch wide, that is, $1/16$ inch as measured longitudinally of the test specimen.

From the foregoing, the method of carrying out our improved process, the method of constructing and using our improved apparatus and our improved test specimen together with the several advantages thereof may now be more fully explained and readily understood. As has heretofore been indicated one of the main advantages of our improved process, apparatus and specimen, is that we are enabled to test metal specimens at a high temperature. By "high temperature" we mean a temperature above which it is impractical directly to associate strain gauges of the type herein mentioned with the specimen, as for instance, by cementing the strain gauge directly onto the surface of the specimen to be tested, as heretofore has been customary. Generally, temperatures above 200° F. damage or destroy the cement used. Further, our apparatus is fully effective to test metal specimens up to the melting point thereof. Still further, and quite equally as important, our apparatus permits an extremely high speed of testing. For instance, we have used our apparatus to make tests in which the speed of elongation has been in the neighborhood of 2 inches of elongation per second per inch of gauge length. In this case the results to be observed and which it is desired to measure by electrical apparatus in the manner well understood, may extend over a period of time on the order of only .015 of a second.

With the foregoing in mind our process is carried out in the apparatus shown by first cementing the gauges G to the upper and under sides of the flexible arms 42 and 43, near the outer ends. In practice the arms 42 and 43 may be made of spring material such as a heat resistant nickel alloy. The screws 54 are run up in the yokes 39 so as to raise the chucks, it being understood that the clamping screws 77 are released to permit this movement. The leads from the electrical strain gauges G are connected to any suitable form of measuring apparatus in accordance with practice which is well known and well understood to those skilled in the art. The specimen S is put in place in the apparatus, being firmly clamped in the upper fixed jaw 14 and in the lower movable jaw 16. The outer ends of the arms 42 and 43 are now brought down onto the tops of the lug 78 by running in on the screws 54, thus pre-stressing all of the gauges in directions opposite that which the gauges will move when the specimen S elongates in response to the pull. The arms 42 and 43 are bowed by the movement of their outer ends relative to their inner ends with the convex surface of the bows facing the direction of movement of the specimen S when it is put under tension. By observing suitable instruments, not shown, in circuit with the gauges G it will be apparent that the gauges which will record the results of the test may be brought to zero or, if desired, may be set at any predetermined figure. Electric current of suitable value is now passed through the specimen, bringing it quickly and uniformly to whatever temperature is desired and which is indicated by suitable instruments, not shown. With the apparatus thus readied, the pull is effected by opening the valve 23 and subjecting the specimen to the desired stress as indicated on the gauge 24, thus subjecting the specimen to a known amount of load per cross sectional area in the gauge length L. If the specimen is to be tested to destruction it will be apparent that the specimen will part somewhere in the gauge length L. Upon this occurrence it will be seen that the lower surface of arms 43 will return to a horizontal, non-stressed position in response to the return of the springs to normal position. The upper arms 42 may return only partially to a horizontal position but the degree of return of all of the arms can be integrated in a manner well understood in the electrical recording system. The actual results of the test are read by means of the instruments not shown and which are standard in the art.

If it is desired to do so there may be associated with one of the lower arms 43 an electric switch 81 which has an arm 82 and a hook portion 83 underlying the arm 43. The switch is normally closed and is in circuit with the testing apparatus in such manner that when the switch is opened by downward movement of the arm 43, the test data being recorded ceases. This provides means for reading only a portion of a test, if that is desired.

It is to be noted that our improved process and apparatus provides means wherein strain gauges of the variable resistance type are operatively associated with and removed from the specimen S in such manner as not to be affected in any manner by the heat supplied to the specimen. Furthermore, the lugs 78 of our improved specimen have been found in actual practice not to create local cold spots at the points where the spring arms 42 and 43 contact the specimen. Therefore, to a very practical degree the test specimen S is heated uniformly throughout the entire gauge length L. Furthermore, by pre-stressing the strain gauges we assure that these gauges remain always within the operating range thereof and that the gauges consequently are not damaged when the specimen is strained, even to destruction. It will be noted that the ends of the upper arms 42 are located on the edges of the lugs 78 away from the gauge length L whereas the inner ends of the arms 43 are located on the edges of the lugs lying within the gauge length L. Upon parting of the strip during the test there is no likelihood of the lower arms being bent downwardly far enough to damage the gauges.

While we have spoken of having the movable chuck 16 at the "lower" end of the specimen S, it will be apparent that with equal facility the upper chuck 14 may be the movable one whereas the lower chuck 16 may be the stationary one. Likewise, it will be readily apparent that mechanical tensioning means may be substituted for the fluid pressure means shown. At all events, by pre-stressing the gauges oppositely to the direction they move during the test, which amount of pre-stressing ordinarily will be in excess of the strain to be imposed on the specimen, we not only obtain the advantages heretofore mentioned but also position the arms 42 and 43 so that they in no way interfere with the straining of the specimen. Thus, we pre-stress the spring arms 42 and 43, and relieve this stress proportionally upon elongation of the specimen.

From the foregoing, it will be apparent that we have devised an improved process and apparatus for testing metals and improved specimen for use therewith. In actual practice we have found that our improved process and apparatus make possible the testing of metals at high, uniform temperatures and at high rates of pull. Our improved process, apparatus and specimen have been used successfully in solving problems associated with rocket engine metallurgy and investigations of metals for use with rockets and high speed aircraft.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:

1. In apparatus for testing specimens of material of the kind embodying fixed and movable chucks for engaging opposite ends of the specimen, flexible arms having inner ends adapted to contact the specimen adjacent the extremities of a gauge length on said specimen, means supporting the flexible arms adjacent their outer ends, means to shift the support and hence the outer ends of the arms longitudinally relative to the specimen thereby to strain the flexible arms and cause them to bow, and strain gauges secured to the flexible arms intermediate the ends thereof.

2. Apparatus as defined in claim 1 in which the strain gauges are located adjacent the supporting means for said arms.

3. Apparatus as defined in claim 1 in which the supporting means for the flexible arms comprises screw means for shifting the same longitudinally, and locking means for securing the supporting means in selected shifted position.

4. In apparatus for testing specimens of material embodying fixed and movable chucks for engaging opposite ends of the specimen, arms of spring metal stock having inner ends disposed to contact the specimen immediately adjacent the extremities of a gauge length thereon, a chuck engaging the outer ends of the arms, a holder for said chuck supporting it for movement longitudinally relative to the specimen, screw means operatively connected between the chuck and holder for moving the same, and strain gauges of the variable electric resistance type secured to the upper and lower sides of the arms adjacent the chuck.

5. Apparatus as defined in claim 4 in which the specimen is provided with outstanding lugs against which the inner ends of the arms are adapted to bear.

References Cited in the file of this patent

UNITED STATES PATENTS

| | | |
|---|---|---|
| 741,703 | Olsen | Oct. 20, 1903 |
| 2,014,357 | Klemperer | Sept. 10, 1935 |
| 2,346,981 | Manjoine | Apr. 18, 1944 |
| 2,423,867 | Zener et al. | July 15, 1947 |
| 2,436,317 | Manjoine | Feb. 19, 1948 |
| 2,617,293 | Schnadt | Nov. 11, 1952 |
| 2,677,187 | Buist et al. | May 4, 1954 |
| 2,685,195 | Streblow | Aug. 3, 1954 |
| 2,744,181 | Rea | May 1, 1956 |

FOREIGN PATENTS

| | | |
|---|---|---|
| 200,369 | Great Britain | May 18, 1911 |
| 901,157 | France | Oct. 3, 1944 |
| 58,630 | Netherlands | Dec. 16, 1946 |